United States Patent
Rao

(10) Patent No.: US 10,349,103 B2
(45) Date of Patent: *Jul. 9, 2019

(54) SYSTEMS AND METHODS FOR SYSTEMS AND METHODS FOR SECURELY STREAMING MEDIA CONTENT

(71) Applicant: SLING MEDIA L.L.C., Foster City, CA (US)

(72) Inventor: Padmanabha R. Rao, Palo Alto, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,345

(22) Filed: Mar. 5, 2018

(65) Prior Publication Data

US 2018/0199086 A1  Jul. 12, 2018

Related U.S. Application Data

(63) Continuation of application No. 15/359,125, filed on Nov. 22, 2016, now Pat. No. 9,942,587, which is a continuation of application No. 14/842,452, filed on Sep. 1, 2015, now Pat. No. 9,510,035, which is a continuation of application No. 14/191,039, filed on
(Continued)

(51) Int. Cl.
| | |
|---|---|
| *H04L 29/06* | (2006.01) |
| *H04N 21/258* | (2011.01) |
| *H04N 7/173* | (2011.01) |
| *H04N 21/239* | (2011.01) |
| *H04N 21/414* | (2011.01) |
| *H04N 21/4227* | (2011.01) |
| *H04N 21/433* | (2011.01) |
| *H04N 21/6334* | (2011.01) |
| *H04N 21/4408* | (2011.01) |

(52) U.S. Cl.
CPC ... *H04N 21/25816* (2013.01); *H04L 63/0428* (2013.01); *H04L 63/0435* (2013.01); *H04L 63/08* (2013.01); *H04L 63/102* (2013.01); *H04L 65/60* (2013.01); *H04N 7/17318* (2013.01); *H04N 21/2396* (2013.01); *H04N 21/25841* (2013.01); *H04N 21/25875* (2013.01); *H04N 21/41407* (2013.01); *H04N 21/4227* (2013.01); *H04N 21/4331* (2013.01); *H04N 21/4408* (2013.01); *H04N 21/63345* (2013.01)

(58) Field of Classification Search
CPC .................................................. H04L 63/0428
USPC ........................................................ 713/168
See application file for complete search history.

(56) References Cited

U.S. PATENT DOCUMENTS

| | | | |
|---|---|---|---|
| 8,667,279 B2* | 3/2014 | Rao ................... | H04N 7/17318 713/168 |
| 2002/0196939 A1* | 12/2002 | Unger .................. | H04N 7/162 380/216 |

* cited by examiner

*Primary Examiner* — Longbit Chai
(74) *Attorney, Agent, or Firm* — Lorenz & Kopf LLP

(57) ABSTRACT

Systems and methods are provided for securely providing a media stream from a server device to a remote player via a communications network. A request for a connection is received from the remote player at the server device via the communications network. In response to the request for the connection, an authorization credential is requested from a central server via the communications network. Further, in response to the authorization credential received from the central server, the media stream between the server device and the remote player can be established over the communications network. At least a portion of the media stream may be encrypted based upon the authorization credential.

20 Claims, 4 Drawing Sheets

Related U.S. Application Data

Feb. 26, 2014, now Pat. No. 9,143,827, which is a continuation of application No. 12/166,039, filed on Jul. 1, 2008, now Pat. No. 8,667,279.

SYSTEMS AND METHODS FOR SYSTEMS AND METHODS FOR SECURELY STREAMING MEDIA CONTENT

PRIORITY CLAIM

This Application is a continuation of U.S. patent application Ser. No. 15/359,125 filed Nov. 22, 2016, which is a continuation of U.S. patent application Ser. No. 14/842,452 filed Sep. 1, 2015, which is a continuation of U.S. patent application Ser. No. 14/191,039 (U.S. Pat. No. 9,143,827) filed on Feb. 26, 2014, which is a continuation of U.S. patent application Ser. No. 12/166,039 (now U.S. Pat. No. 8,667,279) filed Jul. 1, 2008.

TECHNICAL FIELD

The present invention generally relates to streaming of media content, and more particularly relates to systems and methods for improving the security of media streaming.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through a cable, wireless or other medium. Programming is typically received at a receiver such as a "set top box" (STB) that demodulates the received signals and that converts the demodulated content into a format that can be presented to the viewer on a television or other display.

More recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant or other remote device capable of playing back the packetized media stream for the viewer. Placeshifting therefore allows consumers to view their media content from remote locations such as hotel rooms, offices, or any other locations where portable media player devices can gain access to a wireless or other communications network.

While placeshifting does greatly improve the convenience afforded to the viewer, the inherently insecure nature of many communications networks (such as the Internet) continues to pose challenges. That is, while it remains desirable to allow consumers to place shift their media playing experience, it is also desirable to ensure that only authorized users and players are allowed access to valuable media content.

It is therefore desirable to create systems and methods for securely placeshifting media content from a place shifting device to a remote media player. These and other desirable features and characteristics will become apparent from the subsequent detailed description and the appended claims, taken in conjunction with the accompanying drawings and this background section.

BRIEF SUMMARY

Various systems and methods are provided for securely providing a place-shifted media stream from a place shifting device to a remote player via a communications network. A request for a connection is received from the remote player at the place shifting device via the communications network. In response to the request for the connection, an authorization credential is requested from a central server via the communications network. Further, in response to the authorization credential received from the central server, the place-shifted media stream between the place shifting device and the remote player can be established over the communications network. At least a portion of the place-shifted media stream is encrypted based upon the authorization credential.

Other embodiments provide systems for securely providing a place-shifted media stream to a remote player via a communications network. The system comprises a network interface to the communications network and a receiver interface to a medium separate from the communications network. A receiver is configured to receive media content from the receiver interface, and a transcoder is configured to packetize the received media content for transport over the communications network. Control circuitry in communication with at least the network interface and the transcoder is configured to receive a request for a connection from the remote player via the network interface, to request an authorization credential from a central server via the network interface in response to the request for the connection, and, in response to receiving the authorization credential from the central server via the network interface, to establish the place-shifted media stream to the remote player via the network interface. In various embodiments, at least a portion of the place-shifted media stream may be encrypted based upon the authorization credential.

Still other embodiments provide a method of presenting a place-shifted media stream to a user of a remote device, wherein the place-shifted media stream is provided from a place shifting device to the remote device over a communications network. The user is authenticated to a central server via the communications network. Upon successful authentication with the central server, a connection to the place shifting device is requested. Upon receiving a response from the place shifting device, authorization is requested to connect to the place shifting device from the central server via the communications network. An authorization response comprising an authorization credential is received from the central server via the communications network, and the place-shifted media stream is established, In various embodiments, at least a portion of the place-shifted media stream may be encrypted based upon the authorization credential.

Still other embodiments provided a method of allowing a place-shifted media stream to be provided to a user of a remote device, wherein the place-shifted media stream is provided from a place shifting device to the remote device over a communications network. A first request is received from the remote device via the communications network, wherein the first request comprises a user credential associated with the user. The user credential is verified and, in response to successful verification, a first response is transmitted to the remote device that identifies the place shifting device. An authentication credential is then transmitted to the remote device in response to a second request from the remote device and to the place shifting device in response to a key request from the place shifting device to thereby allow the remote device and the place shifting device to establish the place-shifted media stream based at least in part upon the authentication credential. In various embodiments, at least a portion of the place-shifted media stream may be encrypted based upon the authorization credential.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary secure placeshifting system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, place shifting of media content is made more secure through the use of various authentication and/or encryption features. In various embodiments, the place shifting device verifies that it has an approved capability to provide placeshifting functions. This verification may be based upon "rights" set or modified on the placeshifting device by a human. Alternatively, placeshifting "rights" may be set or modified based upon information received via a satellite, cable or other connection that also provides programming content to the device. In other embodiments, authentication in real-time (or near real-time) can be performed to authenticate the user to a central server and/or to the placeshifting device, and/or to verify that the requesting remote player/device is authentic and approved to receive placeshifted content. A credential-sharing environment may be further constructed so that the transmitting and receiving devices receive cryptographic keys and/or other credentials from a secure central server. The authentication credentials provided from the central server can be used to encrypt some or all of the placeshifted media stream. In various further embodiments, the amount of encryption is adjusted based upon such factors as the quality of the video stream, the processing capabilities of the remote media player, the bandwidth of the intervening communications links, and/or other factors as appropriate. The various concepts described herein may be deployed independently from one another, or two or more may be combined with each other in any manner to produce an even more secure place shifting environment.

The secure mechanisms described herein may find particular benefit when used with hardware capable of both receiving television signals (e.g., signal feeds from a satellite, cable, wireless or other source) and of providing the place shifting function. The invention is not so limited, however; to the contrary, the security features described herein may be used in conjunction with conventional placeshifting systems and devices, including those that interact with other external devices such as television receivers, removable media players, digital or personal video recorders, and/or other sources of programming content.

Figure 1:
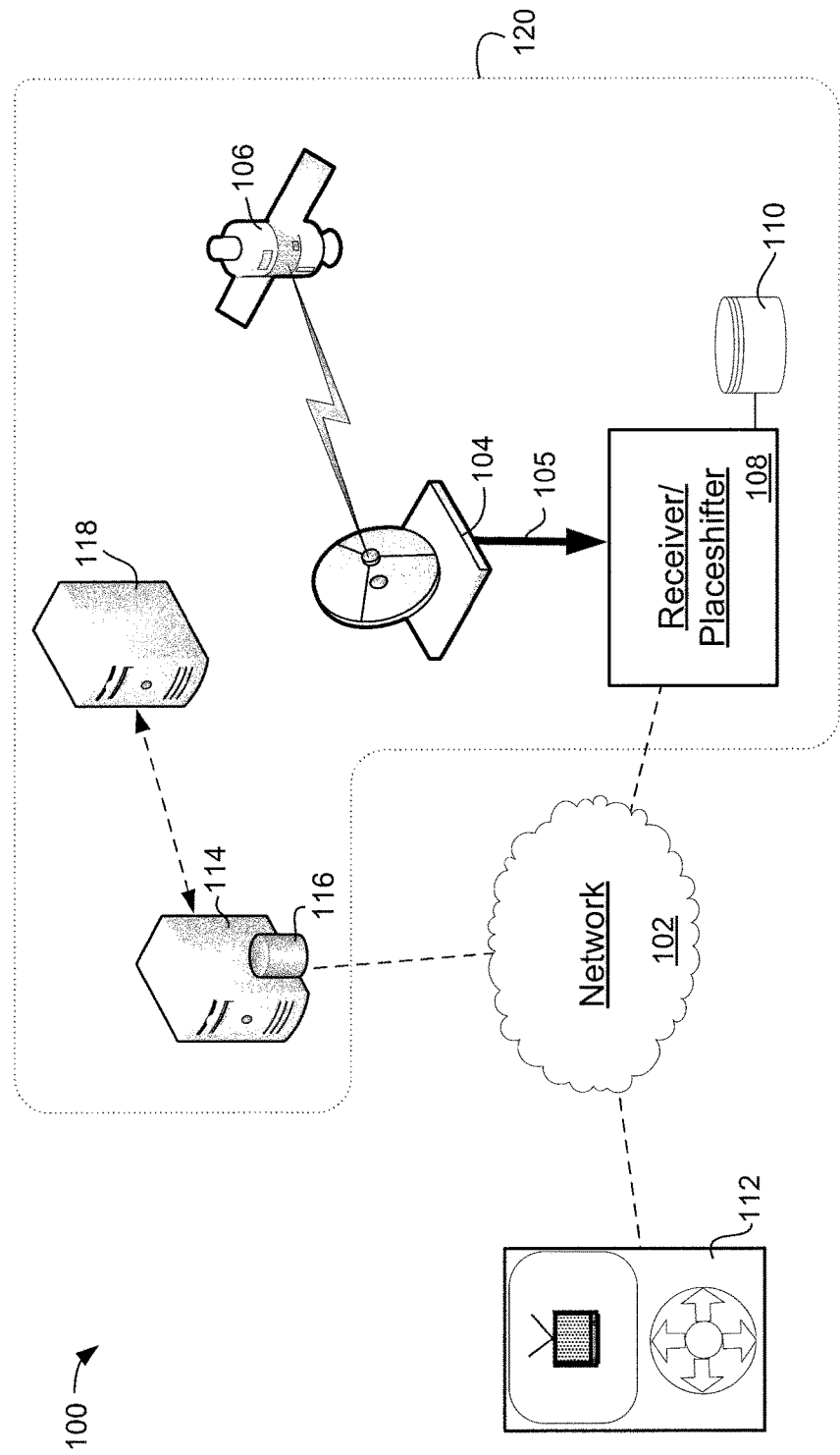

Turning now to the drawing figures and with initial reference to FIG. 1, an exemplary placeshifting system 100 suitably includes a placeshifting device 108 that packetizes media content for transmission to a remote device 112 over a communications network 102. In embodiments that provide enhanced security, a central server 114 that maintains a database 116 of information is also able to communicate with placeshifting device 108 and remote device 112 via network 102. Although FIG. 1 shows only a single placeshifting device 108, a single remote device 112 and a single central server 114, in practice system 100 may include any number of servers 114 that are able to interact with hundreds, thousands or even more placeshifting device 108, each of which may be able to stream media content to any number of different remote devices 112.

Network 102 is any digital or other communications network capable of transmitting messages between senders and receivers. In various embodiments, network 102 includes any number of public or private data connections, links or networks supporting any number of communications protocols. Network 102 may include the Internet, for example, or any other network based upon TCP/IP or other conventional protocols. In various embodiments, network 102 also incorporates a wireless and/or wired telephone network, such as a cellular communications network for communicating with mobile phones, personal digital assistants, and/or the like. Network 102 may also incorporate any sort of wireless or wired local area networks, such as one or more IEEE 802.3 and/or IEEE 802.11 networks. Placeshifting device 108 is therefore able to communicate with remote device 112 in any manner. Such communication may take place over a wide area link that includes the Internet and/or a telephone network, for example; in other embodiments, communications between devices 108 and 112 may take place over a wired or wireless local area link incorporated within network 102, with messages to central server 114 taking place over a wide area link also incorporated within network 102.

Placeshifting device 108 is any component, hardware, software logic and/or the like capable of transmitting a packetized stream of media content over network 102. In various embodiments, placeshifting device 102 incorporates suitable transcoder logic to convert audio/video or other media data into a packetized format that can be transmitted over network 102. The media data may be in any format, and may be received from any source such as a broadcast, cable or satellite television programming source, a "video-on-demand" or similar source, a digital video disk (DVD) or other removable media, a video camera, and/or the like. In various embodiments, placeshifter device 108 is any of the various SLINGBOX products available from Sling Media of Foster City, Calif., which are generally capable of receiving media content from an external digital video recorder (DVR), set top box (STB), cable or satellite programming source, DVD player, and/or the like.

In further embodiments, placeshifter device 108 may also include content receiving capabilities. That is, device 108 may be a hybrid STB or other receiver that also provides transcoding and placeshifting features, as described more fully below. Such a device may receive satellite, cable, broadcast and/or other signals that encode television programming 105 from an antenna 104, modem, server and/or other source. The receiver may further demodulate or otherwise decode the received signals 105 to extract programming that can be locally viewed and/or place shifted to a remote viewer 112 as appropriate. Such devices 108 may also include a content database 110 stored on a hard disk drive, memory, or other storage medium to support a personal or digital video recorder (DVR) feature as appropriate.

In the exemplary embodiment illustrated in FIG. 1, placeshifting device is a hybrid receiver/transcoder that receives digital broadcast satellite (DBS) signals 105 from a satellite 106 at an antenna 104. Equivalent embodiments, however, could receive programming 105 from a cable connection, broadcast source, removable media, service provider accessible via network 102, any external device and/or the like. In embodiments that include DVR functionality, programming may be stored in database no as desired (e.g., in response to user/viewer programming instructions) for subsequent viewing on a television or other display located in relatively close proximity; programming need not be stored in all instances or embodiments, however, and programming could be alternately provided in real time. As noted above, content may be presented on a television or other display that is physically connected to device 108, or may be placeshifted from device 108 to a remote device 112 over network 102.

Remote device 112 is any device, component, module, hardware, software and/or the like capable of receiving a media stream from placeshifting device 108. In various embodiments, remote device 112 is personal computer (e.g., a "laptop" or similarly portable computer, although desktop-type computers could also be used), a mobile phone, a personal digital assistant, a personal media player (such as the ARCHOS products available from the Archos company of Igny, France) or the like. In many embodiments, remote device 112 is a general purpose computing device that includes a media player application in software or firmware that is capable of securely connecting to placeshifting device 108, as described more fully below, and of receiving and presenting media content to the user of the device as appropriate.

Many different placeshifting scenarios could be formulated based upon available computing and communications resources, as well as consumer demand. In various embodiments, consumers may wish to placeshift content within a home, office or other structure, such as from a placeshifting device 108 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote device 112 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

As noted at the outset, it is generally desirable to maintain security of the placeshifting process to ensure that unauthorized users and unauthorized players do not gain access to programming content. This is particularly true when placeshifting device 108 is an integrated receiver/DVR/placeshifter, since the amount of valuable content available within the device could be significant. To maintain the security of the connection, then, various embodiments establish a logical barrier around a trusted domain or authorized zone 120, which may include the placeshifter device 118 itself, as well as any backend servers 114, 118 that are maintained by service providers or other trusted entities. By requiring users to interact within a secure infrastructure 100, suitable authentication or other security mechanisms can be implemented to prevent unauthorized access to resources contained within trusted domain 120.

To that end, a service provider may provide a central server 114 that interacts with placeshifting device 108 and/or mobile device 112 over network 102. Server 114 is any computer system or other computing resources that are able to respond to process requests for information received via network 102. Server 114 may, for example, maintain a database 116 that includes user account information, as well as cryptographic keys or other authentication credentials associated with the various placeshifting devices 108 as appropriate.

Central server 114 facilitates secure transactions between the remote device 112 and the placeshifting device 108 in any manner. In various embodiments, users of remote devices 102 are able to locate placeshifting devices 108 on network 102 by contacting central server 114, authenticating to server 114 with a userid/password pair or other credential, and then receiving information that allows a subsequent connection request to one or more placeshifting devices 108 associated with the user in database 116. The remote device 112 is then able to contact the placeshifting device 108 directly via network 102 to request a connection. Upon receiving connection requests from both placeshifting device 108 and remote device 112, central server 114 suitably provides a cryptographic key or other credential that can be used to establish a secure media stream between devices 108 and 112, as appropriate, and as more fully described below. Central server 114 is therefore able to greatly assist in maintaining the security of the placeshifted media stream, even though the server 114 need not be logically or physically interposed between the communicating devices 108 and 112.

In further embodiments, a server 114 involved with user authentication and/or key management may communicate with one or more backend servers 118 for additional security. Backend server 118 may have access to billing information, for example, that can be cross-checked against information received at server 114 to ensure that the user requesting services has properly paid for such services, has maintained an account in good standing, and/or the like. Queries to backend server 118 may be processed in real-time (or near real-time) over a secure link apart from network 102. In various embodiments, backend server 118 may be affiliated with a provider of satellite or cable television signals to device 108, for example. In such embodiments, server 118 could be used to ensure billing compliance, but could additionally (or alternatively) enable further services to the user in any manner. For example, a user authenticated with server 114 could order services (e.g., enablement of placeshifting features), issue an instruction to purchase a pay-per-view program or to record a program on a DVR associated with device 108, pay a bill, and/or take some other action with respect to the user's account with backend server 118 through the convenience of network 102. In embodiments wherein the user has ordered additional services or content, server 118 may coordinate messages transmitted via satellite 116 (or, equivalently, a cable connection or the like) to update settings on device 108 as appropriate. Because a secure connection within trusted domain 120 exists from server 114 to placeshifting device 108, new services and features can be enabled without data transmissions across relatively unsecured network 102.

Figure 2:
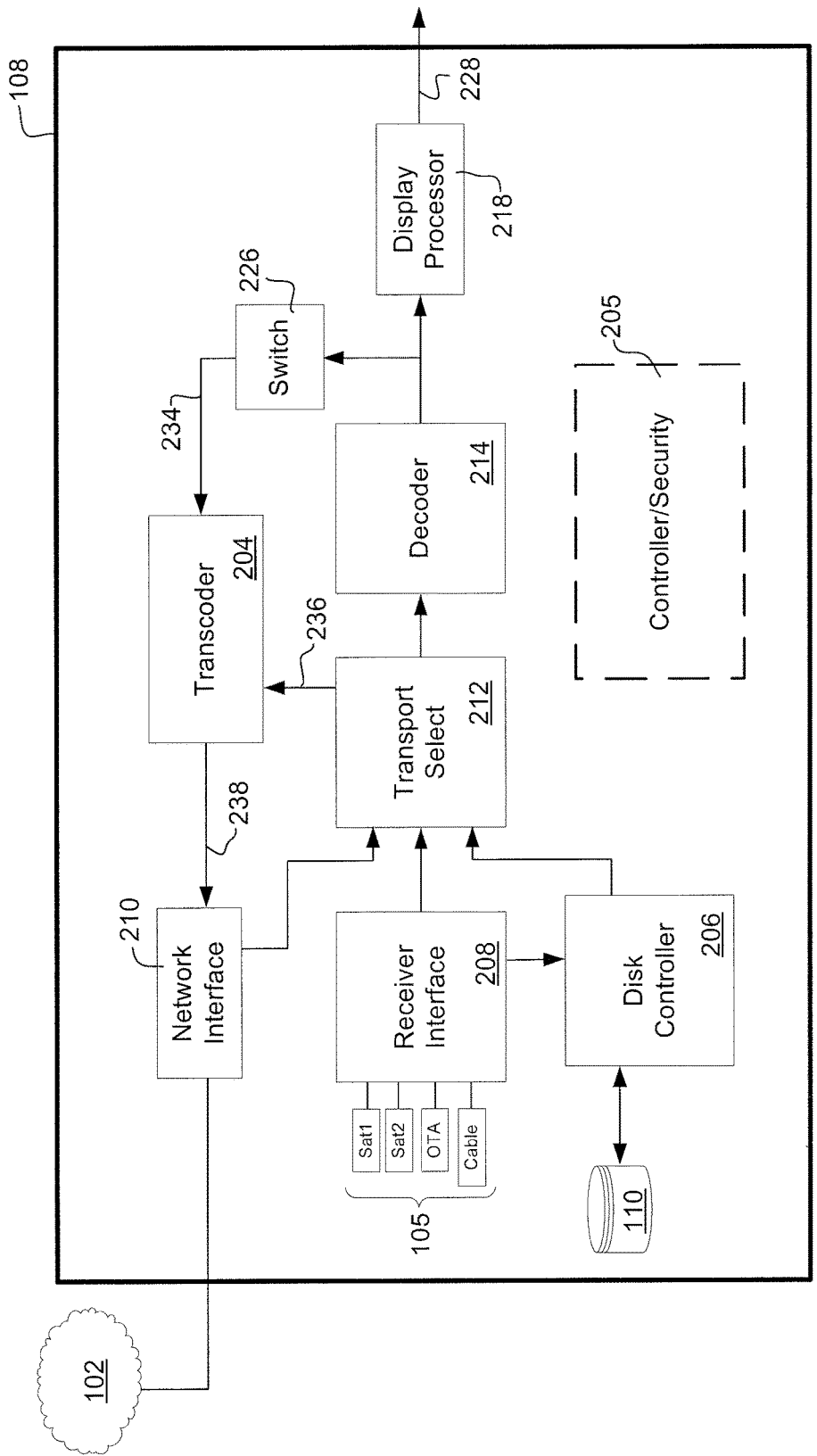
FIG. 2 is a block diagram of an exemplary placeshifting device.

FIG. 2 provides additional detail about an exemplary placeshifting device 108 that includes a receiver 208, a decoder 214 and a placeshifting transcoder 204, as appropriate. Although FIG. 2 describes a hybrid device 108 capable of receiving and decoding content in addition to placeshifting, the concepts set forth herein could be equivalently applied to devices 108 that simply provide placeshifting of media content received and/or decoded at an external receiver, DVR, media player, server and/or the like. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Device 108 may be logically and physically implemented in any manner. FIG. 2 shows various logical and functional features that may be present in an exemplary device 108; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver 208, transport selector 212, decoder 214, display processor 218 and/or disk controller 206, as appropriate. In such embodiments, the integrated SoC processor may interact with a transcoder module 204 implemented with a separate processor as well as any other input or output devices to produce desired outputs based upon inputs received from local or remote users. In other embodiments, transcoder 204 may also be incorporated into the SoC design. Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of device 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components device 108. Various routines, methods and processes executed within device 108 are typically carried out under control of control logic 205, as described more fully below. In many embodiments, the various security and authentication features described with respect to FIG. 3 below are carried out primarily within control logic 205, which may be executing on any processor within device 108.

As noted above, many embodiments of device 108 include a receiver 208, which is any hardware, software, firmware and/or other logic capable of receiving media content via one or more content sources 105. In various embodiments, content sources 105 may include cable television, DBS, broadcast and/or other programming sources as appropriate. Receiver 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver 208 may provide content received from any source to a disk or other storage medium in embodiments that provide DVR functionality. In such embodiments, device 108 may also include a disk controller module 206 that interacts with an internal or external hard disk, memory and/or other device that stores content in a database 110, as described above.

In the embodiment shown in FIG. 2, device 108 also includes an appropriate network interface 210, which operates using any implementation of protocols or other features to support communication by device 108 on network 102. In various embodiments, network interface 210 supports conventional LAN, WAN or other protocols (e.g., the TCP/IP or UDP/IP suite of protocols widely used on the Internet) to allow device 108 to communicate on network 102 as desired. Network interface 210 typically interfaces with network 102 using any sort of LAN adapter hardware, such as a conventional network interface card (NIC) or the like provided within device 108.

Transport stream select module 212 is any hardware and/or software logic capable of selecting a desired media stream from the available sources. In the embodiment shown in FIG. 2, stream select module 212 is able to generate video signals for presentation on one or more output interfaces 228. In various embodiments, stream select module 212 is also able to provide an encoded video signal 236 to transcoding module 204, although this feature is entirely optional. In such embodiments, however, transcoding module 204 would decode the video signal 236 for packetizing and subsequent transmittal over network 102, as described elsewhere.

More typically, however, stream select module 212 responds to viewer inputs (e.g., via control logic 205) to simply switch encoded content received from a live source 105 or from storage 110 to one or more decoder modules 214. Device 108 may include any number of decoder modules 214 for decoding, decompressing and/or otherwise processing received/stored content as desired. Generally speaking, decoder module 214 decompresses or otherwise processes received content from stream select module 212 to extract an MPEG or other media stream encoded within the stream. The decoded content can then be processed by a display processor modules 218 to create a display for the viewer in any appropriate format.

Display processor module 218 includes any appropriate hardware, software and/or other logic to create desired screen displays at interfaces 242, 244, 246 as desired. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with device 108 or the like. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

In hybrid receiver/placeshifter devices 108, a hardware or software switch 226 may also be provided that allows one or more output channels to be diverted to a transcoding module 204 for placeshifting over network 102. In such embodiments, switch 226 suitably re-directs output from one of the output channels (e.g., channel 228) in decoded and decompressed form to the transcoding module 204 as appropriate. An output signal encoded in ITU656 format, for example, may be provided as an input to transcoding module 204 to support digital-to-digital conversion to a media format that can be readily transmitted on network 102. In other embodiments, digital or analog signals may be provided to transcoder 204 in any format.

To that end, transcoding module 204 is any hardware, software, firmware and/or combination thereof that is capable of producing a media stream capable of being routed on network 102 to a remote device 112. In various embodiments, transcoding module is implemented in a semiconductor chip having digital signal processing capabilities, such as a DAVINCI model processor available from the Texas Instruments Corporation of Dallas, Tex., although other embodiments may use any sort of processor or other circuitry (including the same processor or other circuitry used to implement any other components shown in FIG. 2) to implement the transcoding function. Generally speaking, transcoding module 204 receives either a decoded signal 234 decoded by decoders 214 or 216 (and optionally further processed by display processors 218 or 220) or an already encoded stream 236, performs a digital-to-digital conversion to create a media stream in a desired format and having desired parameters, and provides the converted stream for transport on network 102. One example of a placeshifting system that includes transcoding capabilities is described in U.S. Patent Publication 2006/0095471, although other placeshifting and/or transcoding features may be implemented in a wide array of alternate embodiments. FIG. 2 shows the output 238 of transcoding module 204, which includes the placeshifted video stream, as being provided for transport using network interface 210. In an alternate embodiment, a different network interface 210 could be provided, such as a stack residing within module 204 itself. In various embodiments, it may be desirable to secure any inter-chip communications between transcoding module 204 and other components of device 108 through any sort of physical or logical security techniques. Signals 234, 236 and/or 238 may be provided on signal pins that are physically embedded within a printed circuit board, for example, to make access to such signals more difficult. Further, signals 234, 236 and/or 238 may be encrypted or encoded between modules in any manner to prevent unauthorized usage in the event that such signals are physically intercepted.

In operation, then, placeshifting device 108 suitably receives one or more media streams from a DBS, cable or other source 105, which may be stored in a DVR database 110 or the like as desired. Received and/or stored content may be provided in compressed form (e.g., signal 236) and/or decompressed form (e.g., signal 234) to transcoding module 204, which appropriately converts the received signals to a format that can be transmitted to the remote device 112 over network 110. Control of the placeshifting process, including any communications related to security or authentication, may take place under the direction of control logic 205 executing within device 108.

Figure 3:
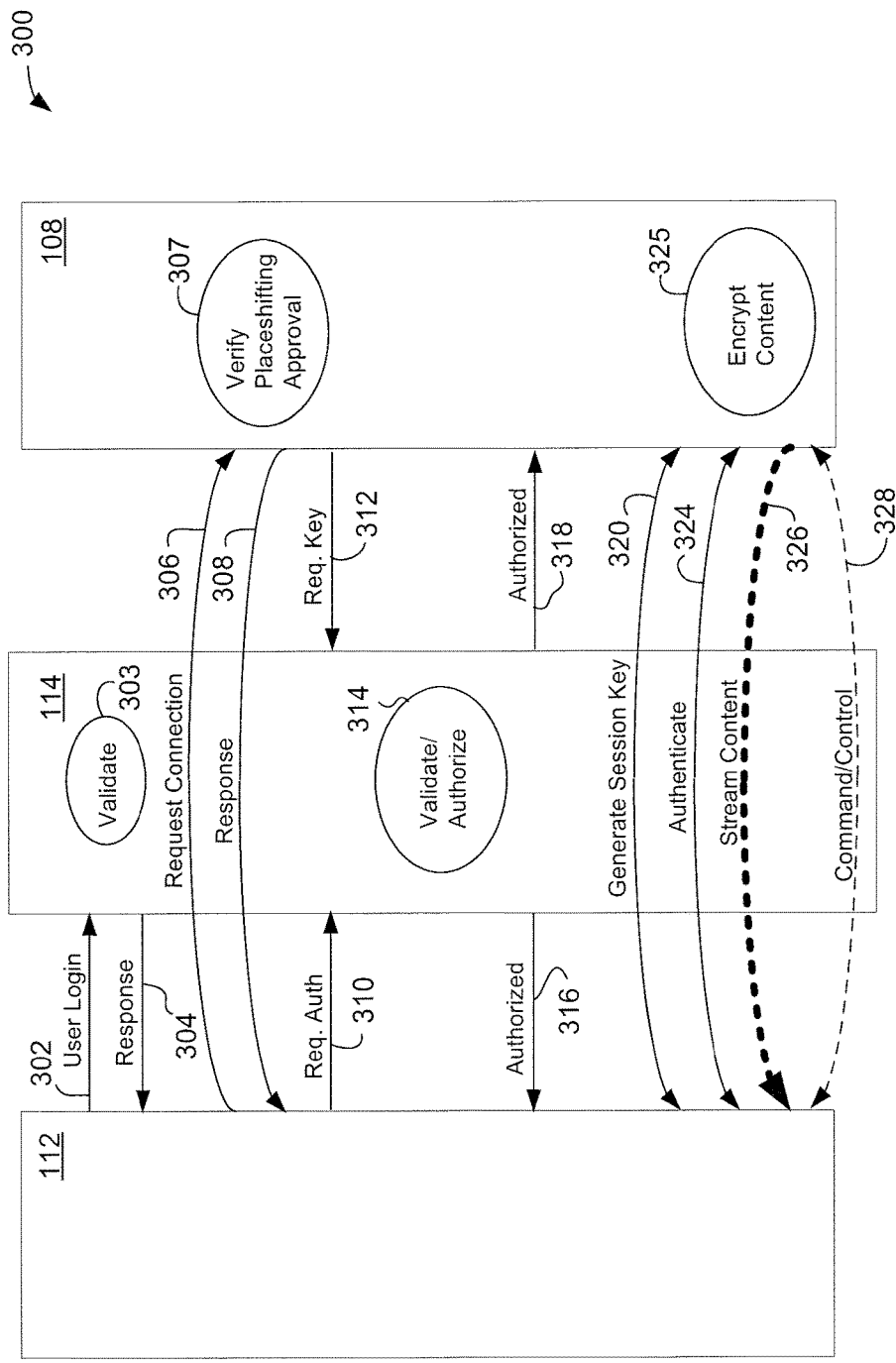
FIG. 3 is a data flow diagram showing exemplary processes for establishing secure placeshifting between a place shifting device and a remote device.

FIG. 3 shows an exemplary process 300 for securely establishing a placeshifting media stream between a placeshifting device 108 and a remote device 112. FIG. 3 shows messages sent and received by each of the entities 108, 112, 114 involved in the security process 300, as well as other actions that may be performed by one or more entities within system 100 (FIG. 1). In practice, the overall process 300 may be implemented with various methods executed by one or more entities 108, 110, 112, as described more fully below. Generally speaking, each of the method steps shown in FIG. 3 may be implemented in software or firmware that may be stored in memory, mass storage or any other storage medium available to the executing device, and that may be executed on any processor or control circuitry associated with the executing device.

Process 300 typically begins with the remote device 112 contacting the central server with a login request (step 302). This may be initiated by, for example, a user of remote device 102 opening a media player application, or otherwise initiating the process of viewing placeshifted media. Step 302 may include providing any sort of identifying information associated with the user, such as any sort of userid/password pair. Alternatively, step 302 could provide a digital signature, any other cryptographic credential, biometric information, and/or any other sort of identifying information to ensure the identity of the user. Step 302 may also include a digital signature, identifier or other credential associated with a media player application or other component of device 112 to ensure that the application is authorized to participate in process 300. Central server 114 suitably validates the received information (step 303) in any manner (e.g., by querying database 116 in FIG. 1). If validation is successful, the user is identified, and a response message may be sent (step 304). In the event that the media player application is out of date, such information may be used to prompt the user to obtain updated software, or for any other purpose.

Response message 304 includes any information that allows the remote device to establish a connection to a desired placeshifting device 108. In various embodiments, response 304 may include address information (e.g., an Internet Protocol (IP) address) relating to one or more placeshifting devices 108 associated with the user's account in a directory or other listing. The response 304 may also include user preferences or other settings established by the user for added convenience.

Upon successful authentication with the central server 114, the remote device 112 is able to request a connection to a particular placeshifting device 108 via network 102 (step 306). This request may be sent using any suitable protocol or other format that can be received an interpreted by placeshifting device 108. In an exemplary embodiment, response 304 includes an IP address or other identifier associated with the placeshifting device 108 that allows the remote device 112 to contact the desired placeshifting device 108 directly via network 102.

Placeshifting device 108 is able to verify the capability to perform placeshifting in any manner (step 307). In various embodiments, device 108 receives a flag or other indication via a separate data connection other than network 102 that indicates availability of placeshifting "rights". For example, in embodiments wherein device 108 includes the ability to receive cable or satellite signals, a placeshifting enablement message may be embedded within signals 105 transmitted to device 108 via the cable or satellite connection, respectively.

In other embodiments, a human physically close to device 108 may be alerted by device 108 to authorize placeshifting. In either case, device 108 may not accept placeshifting requests until placeshifting "rights" are expressly enabled on the device. This may be verified by checking that placeshifting is approved (step 307) just prior to validating the user's request for connection, as shown in FIG. 3, or by simply ignoring requests 306 for placeshifting connections until approval for placeshifting is received.

Placeshifting may be enabled or disabled in any manner, and/or may be differently applied based upon the location or capabilities of remote device 112. For example, placeshifting device 108 may be configured to recognize several "tiers" of service so that placeshifting is enabled only for local area networks, for example, or only for wide area networks. Such functionality may be implemented by comparing IP or other network addresses of devices 108 and 112, for example, when limited placeshifting is enabled. Placeshifting within any particular device 108 may be enabled, disabled, or otherwise adjusted in any manner and on any temporal basis by simply updating the placeshifting "flag" or other data provided to device 108.

If placeshifting is enabled on device 108, then a response message 308 is sent to remote device 112 via network 102. In various embodiments, device 112 also submits a request 312 to central server 114 for an authorization credential that can be used to secure the placeshifted media stream, as described below. Upon receipt of response 308 from placeshifting device 108, remote device 112 also submits a request 310 to central server 114 to obtain the authorization credential that permits secure communication with the particular placeshifting device 108. In various embodiments, the authorization credential is a cryptographic key, such as a symmetric encryption key or the like that permits subsequent secure communications based upon a shared secret. Conventional keys of any length (e.g., 64 or 128 bits) associated with advanced encryption standard (AES) or data encryption standard (DES) algorithms, for example, could be used in various embodiments. In various embodiments, the authorization credential is associated with the particular placeshifting device 108, and may be updated on any temporal basis. Keys may be updated on a periodic or aperiodic basis, for example, or a unique key may be provided in response to each request 312 for added security.

Upon receiving requests 310 and 312, central server 114 suitably validates and authorizes the placeshifting session (step 314). Step 314 may involve querying a backend server 118, for example, to ensure that the placeshifting is approved for the particular user, remote device 112 and/or placeshifting device 108. Alternatively, verification may be resolved locally at central server using database 116 (FIG. 1) or the like. If the transaction is approved, then the authorization credential is transmitted from server 114 to the remote device as message 316, and to the placeshifting device 108 as message 318. In embodiments wherein the credential is already stored within device 108, message 318 may not necessarily include another copy of the credential, but may instead provide an indication that placeshifting with remote device 112 is approved. Authorization credentials will typically be provided using relatively secure connections (e.g., secure hypertext transport protocol (HTTPS) or the like) to prevent any third parties from obtaining the credential through eavesdropping or similar techniques.

When both placeshifting device 108 and remote device 112 have received authorization 316, 318 from the central server 114, then a secure connection may be established directly between the two devices 108, 112 via network 102.

A session key 320 may be generated by each party, for example, using conventional techniques (e.g., as set forth in the AES, DES or other algorithms) and using parameters provided from central server 114. This session key may be based upon the received authentication credential, for example, to allow for mutual encryption/decryption of ensuing communications. The session key is typically negotiated based upon the received credential, and also based upon one or more other parameters known to the communicating devices. These parameters may be embedded within software previously provided (e.g., within a media player application provided to device 112, and/or within a firmware update to device 108) to further enhance placeshifting security. These parameters may be defined in any manner (e.g., in accordance with well-known encryption protocols such as AES, DES and/or the like) and may be updated on any temporal basis. In the event that the cryptographic systems described in FIG. 3 become compromised, for example, a firmware update to device 108 and/or a player update to device 112 may be required to update the various parameters prior to receiving any future approvals (e.g., messages 316, 318) from central server 114.

In various embodiments, a user of remote device 112 may also authenticate separately with placeshifting device 108 (step 324) to further enhance the security of process 300. This authentication may involve providing a userid/password pair, a digital signature, biometric data, and/or any other identifying information associated with the user to placeshifting device 108. Such information may be configured by the user prior to establishing the placeshifting session in any manner. Although FIG. 3 shows authentication step 324 as occurring after negotiation of the session key, such authentication may take place at any point within process 300. Authentication 324 may take place prior to placing of key request 312, for example. Other embodiments may eliminate the additional authentication in step 324 entirely, or make such authentication optional at the discretion of the user or any administrator.

When authentication is complete and the various encryption parameters are properly in place, the placeshifting media stream 326 can be provided over network 102 to remote device 102. Typically, some or all of the content contained within media stream 326 is encrypted (step 325), as described more fully below. Transcoding, encryption and transmission of content in media stream 326 may be adjusted in any manner during operation (step 328). In various embodiments, the media player application associated with remote player 112 provides command and control information to device 108 that may be used to adjust or otherwise control transcoding, encryption or transmission as desired.

From the varying perspectives of devices 108, 112 and central server 114, then, various methods for establishing a secure placeshifting session are described in FIG. 3. With respect to placeshifting device 108, for example, establishing a secure connection suitably includes the broad steps of receiving a request for connection 306 from the remote device, verifying that a placeshifting feature is available within device 307, and then requesting approval for the session from the central server (step 312). In response to the received approval (step 318), which may include a cryptographic key or other authentication credential, placeshifting device 108 is able to establish the secure media stream 326 based upon the received credential. The various steps of this method may be carried out by any processing circuitry or logic associated with device 108, including control logic 205 shown operating in FIG. 2.

With respect to the remote device 112, an initial request is placed to central server 114, which responds 304 with an address or other information about placeshifting device 108. The remote device 112 is then able to request a connection (step 306) from the placeshifting device, and to request the key or other credential upon receipt of a response 308 from device 108. The received credential can then be used to negotiate or otherwise establish the parameters of the secure media stream 326, and to decrypt the content transferred as part of the stream. The various steps of this method may be executed within a media player application or other software executing on remote device 112.

With respect to the central server 114, the initial request 302 is received from remote device 112 and validated (step 303) as appropriate. If the request is valid, information about the placeshifting device 108 is provided (step 304) to allow the remote device 112 to contact the placeshifting device 108 directly. Upon receipt of subsequent requests 310, 312 from device 112, 108 (respectively), central server 114 suitably validates and authorizes the session in any appropriate manner, and transmits the key or other authentication credential to the remote device 112 and/or placeshifting device 112 in any manner. Devices 108 and 112 are then able to independently negotiate the parameters of the secure media stream 326 based upon the shared credential. The various functions and other features of this method may be executed on one or more processors associated with server 114 and/or backend server 118 (FIG. 1), as appropriate.

Figure 4:
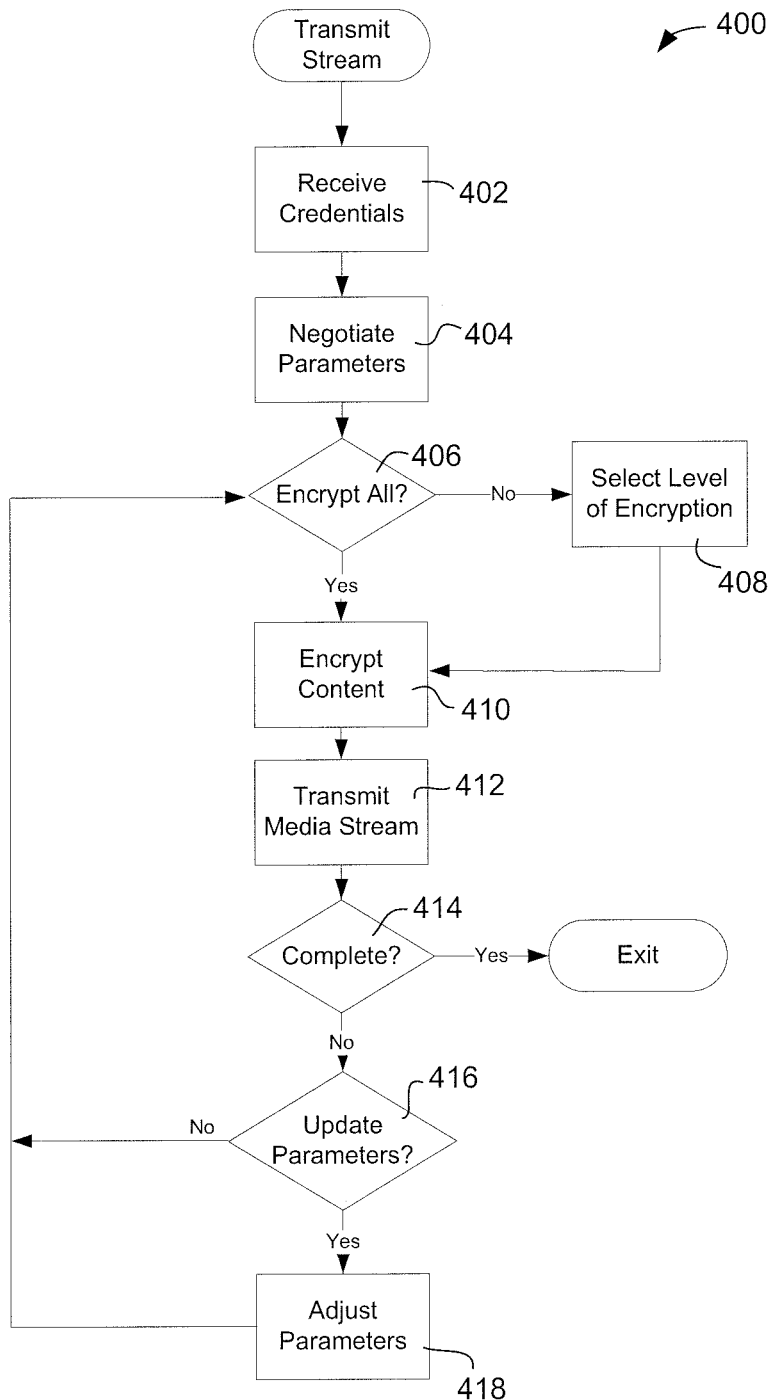
FIG. 4 is a flowchart of an exemplary process for transmitting an encrypted media stream to the remote player.

FIG. 4 shows additional detail about an exemplary technique for transmitting a secure media stream 326 from a placeshifting device 108 to a remote device 112. The various steps shown in FIG. 4 may be executed in software, firmware and/or hardware logic residing within device 108, such as control logic 205 shown operating in conjunction with the various other modules (including transcoder module 204) in FIG. 2.

As noted above, placeshifting device 108 receives authentication credentials (e.g., a cryptographic key) in any manner (step 402). Unique credentials may be provided for each requested session in some embodiments, or a key/credential may be securely stored within device 108 for use in conjunction with multiple placeshifting sessions. In either event, a session key and/or other parameters for a particular placeshifting session may be negotiated with remote device 112 (step 404) based upon the secret information shared between the two devices using any technique, such as conventional AES cryptography.

In some embodiments, resources may be available to encrypt the virtual entirety of media stream 326. In other embodiments (step 406), however, it may not be necessary or desirable to encrypt the entire stream. In embodiments wherein the transcoded media stream is of relatively low quality (e.g., a relatively low bit resolution) in comparison to the received signal, for example, cryptography may be reduced or eliminated. Further, when the remote device has limited computing resources (e.g, a mobile phone or the like), the computational demands of strong cryptography may detract from the user experience. Similarly, if the media stream 326 is being transferred over a relatively low bandwidth link (e.g, a relatively slow telephone connection), the added delay imposed by cryptography may be undesirable. As a result, the level of cryptography applied by the placeshifting device may be selected (step 408) based upon such factors as the quality of the transmitted media stream, the processing capabilities of remote device 112, and/or the bandwidth of the intervening communications network 102.

Cryptography may be applied in any manner (step 410). In various embodiments, cryptography may be applied in any number of "levels", ranging from no encryption, to partial encryption, to encryption of the entire stream depending upon the various factors. "Partial encryption" in this sense can refer to encrypting only certain frames of the media stream, and/or to encrypting only certain blocks of one or more frames. That is, by encrypting only a portion of the transmitted media, security can be maintained without unduly increasing computational overhead. In a conventional MPEG-type video stream, for example, the more fundamental video frames (e.g., I-frames) can be encrypted, with reduced encryption applied to the more heavily compressed frames (e.g, P-frames and/or B-frames). Encrypting only a portion of the macroblocks making up the various frames can similarly reduce computational demands. As one example, a "high" level of encryption could encrypt every outgoing frame of media stream 326, whereas a "medium" level could encrypt a lesser amount, for example between 25-75 percent or so of the blocks in some or all of the I, P and/or B frames. Additional levels could be added for any level of resolution desired.

In further embodiments, the particular blocks that are encrypted could be assigned in any manner, including randomly. That is, the particular blocks may be randomly selected to further enhance the security of the system. Randomizing the encrypted blocks could have a further advantage in terms of spreading processor loading as well, thereby further improving system performance during encryption. The particular randomly-selected blocks may be called out to the receiving party in any manner, such as through header identification, control messages and/or the like to facilitate efficient decryption of media stream 326.

Media stream 326 is therefore encrypted and transmitted to remote device 108 in any manner (step 412) until the placeshifting session is complete (step 414). As noted above, various transcoding, encryption and/or transmission parameters of stream 326 may be adjusted during operation as desired (step 416). If the bandwidth of the connection 102 should degrade, for example, or the processing capabilities of remote device 112 become overloaded, it may be desirable to reduce the quality of the media stream and/or to reduce the amount of encryption applied in step 410. Any of the various parameters used in transcoding and/or encrypting media stream 326 may be adjusted upwardly or downwardly as appropriate to compensate for changing conditions (step 418). In an exemplary embodiment, the encryption level may be set and/or adjusted according to the video bitrate and/or video resolution. High definition video, for example, may always be encrypted at a relatively high level, whereas standard definition video may be encrypted at lower levels in some embodiments, particularly if the video bitrate is relatively low. Various encryption parameters and criteria could be established across a wide range of alternate embodiments.

Using the various systems, methods and other concepts described herein, a number of advantages may be achieved. By requiring authentication to a central server and/or to the placeshifting device, for example, access to placeshifted content can be limited to authorized users. Moreover, by unauthorized media player applications can be rejected through authentication to the central server and/or the use of system secrets for generating session keys. The use of a central server allows for convenient upgrading/updating of keys or player applications in the event of security breach, thereby greatly enhancing system renewability. Moreover, streaming content is encrypted end-to-end, thereby reducing access by untrusted or unapproved third parties. The level of encryption applied may be adjusted based upon video quality, environmental factors and/or the like, further improving system performance. As noted at the outset, the various features may be selectively applied, and not all features will be found in all embodiments.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method for securely providing a media stream from a server device to a remote player via a communications network, the method comprising:
   receiving, at the server device, a request for a connection from the remote player via the communications network;
   in response to the request for the connection, requesting an authorization credential from a separately located central server via the communications network to authorize a media streaming session, wherein the authorization credential is generated and provided by the central server to both of the remote player and the server device via the communications network; and
   establishing the media streaming session between the server device and the remote player over the communications network in response to successfully verify the generated authorization credential by the central server so as to securely provide the media stream from the server device to the remote player, wherein at least a portion of the media stream is encrypted based upon the authorization credential.

2. The method of claim 1 further comprising verifying that media streaming is approved between the server device and the remote player prior to requesting the authorization credential, wherein the verifying is based at least in part upon a geographical location of the remote player.

3. The method of claim 1 further comprising verifying that media streaming is approved between the server device and the remote player prior to requesting the authorization credential, wherein the verifying is based at least in part upon an approval received via a television distribution medium separate from the communications network.

4. The method of claim 1 wherein the authorization credential comprises a symmetric encryption key that is also provided to the remote player over the communications network in response to a request received from the remote player at the central server.

5. The method of claim 4 wherein the establishing of the media stream comprises negotiating encryption parameters for the media stream based at least in part upon the symmetric encryption key.

6. The method of claim 1 wherein broadcast media content is received at the server device via a distribution medium that is separate from the communications network, and wherein the broadcast media content is encoded by the server device to create the media stream for transmission to the media player via the communications network.

7. The method of claim 6 further comprising verifying that media streaming is approved between the server device and the remote player prior to requesting the authorization credential, wherein the verifying is based at least in part upon an approval received via the same distribution medium separate from the communications network that provides the media content.

8. The method of claim 7 wherein the medium separate from the communications network comprises a satellite link.

9. A server system for securely providing a media stream of media content to a remote player via a communications network, the system comprising:
   a network interface to the communications network;
   a transcoder configured to encode the received media content for transport over the communications network; and
   a control circuit in communication with at least the network interface and the transcoder, wherein the control circuit is configured to receive a request for a connection from the remote player via the network interface, to request an authorization credential from a separately located central server via the network interface in response to the request for the connection, wherein the authorization credential is generated by the central server and provided by the central server to both of the remote player and the server system via the communications network to authorize a media streaming session between the remote player and the server system, and wherein the control circuit is further configured to direct the encrypting of the media content to thereby create the encrypted media stream using the authentication credential, and to transmit the encrypted media stream to the remote player via the network interface in response to successfully verify the generated authorization credential by the central server.

10. The system of claim 9 wherein the control circuit is configured to use the authentication credential to negotiate encryption parameters for the media stream based at least in part upon the received authorization credential.

11. The system of claim 9 wherein the control circuit is further configured to use the authentication credential to encrypt at least a portion of the media stream.

12. The system of claim 9 wherein the control circuit is further configured to verify that streaming is approved between the system and the remote player prior to requesting the authorization credential, wherein the verification is based upon an approval received via a medium separate from the communications network.

13. A central computerized authentication system that allows a media stream to be provided to a user of a remote player device, wherein the media stream is provided from a media streaming device to the remote player device over a communications network, the authentication system comprising a hardware processor, a memory and a network interface, wherein the authentication system is separate from both the media streaming device and the remote player device, and wherein the processor of the authentication system is configured to:
   receive, at the central computerized authentication system separate from both of the media streaming device and the remote player device, a first request from the remote player device via the communications network, a first request from the remote player device via the communications network, wherein the first request comprises a user credential associated with the user;

verify the user credential by the central computerized authentication system and, in response to successful verification, transmit a first response to the remote player device that identifies the media streaming device on the communications network; and in response to a second request received at the central computerized authentication system from the remote player device, transmit a shared authentication credential from the central computerized authentication system to both of the remote player device and the media streaming device to thereby allow the remote player device and the media streaming device to establish the media stream communications encrypted by the shared authentication credential.

14. The central computerized authentication system of claim 13 wherein the media stream is encrypted at least in part based upon the authentication credential.

15. The central computerized authentication system of claim 13 wherein the authentication credential is transmitted to the media streaming device in response to a key request from the media streaming device.

16. The central computerized authentication system of claim 13 further comprising validating that the user is authorized to connect to the media streaming device.

17. The computerized authentication system of claim 16 wherein the validating comprises querying an account server having an entry associated with the user.

18. The computerized authentication system of claim 17 wherein the account server is associated with a service provider providing media content to the media streaming device via a medium separate from the communications network, wherein the media stream comprises the media content that is received from the service provider via the separate medium and encoded for transmission on the communications network by the media streaming device.

19. The computerized authentication system of claim 13 wherein the media stream comprises media content that is encoded by the media streaming device for transmission on the communications network, and wherein the media content is delivered to the media streaming device via a medium separate from the communications network, and wherein the shared authentication credential is transmitted to the media streaming device at least in part via the medium that delivers the media content to the media streaming device.

20. The computerized authentication system of claim 13 wherein the media stream comprises media content that is encoded by the media streaming device for transmission on the communications network, and wherein the media content is delivered to the media streaming device via a direct broadcast satellite medium separate from the communications network, and wherein the shared authentication credential is transmitted to the media streaming device at least in part via the direct broadcast satellite medium that delivers the media content to the media streaming device.

* * * * *

UNITED STATES PATENT AND TRADEMARK OFFICE
CERTIFICATE OF CORRECTION

PATENT NO. : 10,349,103 B2  
APPLICATION NO. : 15/912345  
DATED : July 9, 2019  
INVENTOR(S) : Padmanabha R. Rao Page 1 of 1

It is certified that error appears in the above-identified patent and that said Letters Patent is hereby corrected as shown below:

On the Title Page

Item [54], should read:  
SYSTEMS AND METHODS FOR SECURELY STREAMING MEDIA CONTENT Signed and Sealed this  
Twenty-ninth Day of October, 2019

Andrei Iancu  
*Director of the United States Patent and Trademark Office*